United States Patent
Yazaki

(10) Patent No.: US 12,289,017 B2
(45) Date of Patent: Apr. 29, 2025

(54) ROTARY ELECTRIC MACHINE WITH ROTOR WITH THROUGH HOLES AND MAGNET INSERTION HOLES

(71) Applicant: HONDA MOTOR CO., LTD., Tokyo (JP)

(72) Inventor: Manabu Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 17/954,356

(22) Filed: Sep. 28, 2022

(65) Prior Publication Data
US 2023/0094056 A1    Mar. 30, 2023

(30) Foreign Application Priority Data
Sep. 29, 2021    (JP) .................................. 2021-159505

(51) Int. Cl.
*H02K 1/276* (2022.01)
*H02K 1/32* (2006.01)
*H02K 21/14* (2006.01)

(52) U.S. Cl.
CPC ............ *H02K 1/276* (2013.01); *H02K 1/32* (2013.01); *H02K 21/14* (2013.01)

(58) Field of Classification Search
CPC .......... H02K 1/32; H02K 1/325; H02K 1/274; H02K 1/2746; H02K 1/2753; H02K 1/276;
(Continued)

(56) References Cited

U.S. PATENT DOCUMENTS 3,753,062 A * 8/1973 Greenwell ............... H02K 3/28
                                                         318/810
6,965,186 B2 * 11/2005 Fukuda .................. H02K 7/003
                                                         310/264
(Continued)

FOREIGN PATENT DOCUMENTS

JP      08-256441       10/1996
JP      2004-194419     7/2004
(Continued)

OTHER PUBLICATIONS

Japanese Office Action for Japanese Patent Application No. 2021-159505 dated Oct. 8, 2024.
(Continued)

*Primary Examiner* — Tulsidas C Patel
*Assistant Examiner* — Robert E Mates
(74) *Attorney, Agent, or Firm* — Amin, Turocy & Watson, LLP

(57) ABSTRACT

A rotor of a rotary electric machine includes a rotor core. The rotor core is a stacked body in which a plurality of electromagnetic steel sheets are stacked. The electromagnetic steel sheet includes an inner annular portion and an outer annular portion. A first insertion hole into which a rotating shaft is inserted is formed in the inner annular portion. A rotor inner diameter is defined as twice a distance from a center of the first insertion hole to an inner circumferential edge of the inner annular portion. A rotor outer diameter is defined as twice a distance from the center of the first insertion hole to an outer circumferential edge of the outer annular portion. A ratio of the rotor inner diameter to the rotor outer diameter is within a range of 1:1.5 to 1:3.5.

7 Claims, 9 Drawing Sheets

(58) Field of Classification Search
CPC .... H02K 1/2766; H02K 1/2773; H02K 1/278; H02K 1/2781; H02K 21/14
See application file for complete search history.

(56) References Cited

U.S. PATENT DOCUMENTS

| | | | | |
|---|---|---|---|---|
| 7,619,342 | B2* | 11/2009 | Malmberg | H02K 1/2766 310/156.52 |
| 2008/0292480 | A1* | 11/2008 | Godeke | H02K 5/128 310/156.28 |
| 2010/0127584 | A1* | 5/2010 | Gottfried | H02K 1/32 310/156.53 |
| 2014/0167556 | A1 | 6/2014 | Sawada et al. | |
| 2015/0084469 | A1* | 3/2015 | Yazaki | H02K 1/276 310/216.011 |
| 2016/0028296 | A1 | 1/2016 | Kusase et al. | |
| 2016/0211711 | A1* | 7/2016 | Yazaki | H02K 1/276 |
| 2020/0076281 | A1 | 3/2020 | Yoshida et al. | |

FOREIGN PATENT DOCUMENTS

| | | |
|---|---|---|
| JP | 2005-080381 | 3/2005 |
| JP | 2007-151332 | 6/2007 |
| JP | 2007-209197 | 8/2007 |
| JP | 2013-042620 | 2/2013 |
| JP | 2016-025773 | 2/2016 |
| JP | 2017-093059 | 5/2017 |
| JP | 2020-039207 | 3/2020 |
| JP | 2021-019374 | 2/2021 |

OTHER PUBLICATIONS

Japanese Office Action for Japanese Patent Application No. 2021-159505 dated Jun. 18, 2024.

* cited by examiner

ROTARY ELECTRIC MACHINE WITH ROTOR WITH THROUGH HOLES AND MAGNET INSERTION HOLES

CROSS-REFERENCE TO RELATED APPLICATIONS

This application is based upon and claims the benefit of priority from Japanese Patent Application No. 2021-159505 filed on Sep. 29, 2021, the contents of which are incorporated herein by reference.

BACKGROUND OF THE INVENTION

Field of the Invention

The present invention relates to a rotary electric machine equipped with a stator and a rotor.

Description of the Related Art

A rotary electric machine includes a stator and a rotor. The stator includes a plurality of teeth portions. A slot is formed between adjacent teeth portions. An electromagnetic coil is provided in the slot. On the other hand, the rotor has permanent magnets.

The rotary electric machine functions as, for example, a motor. In this case, the electromagnetic coils are energized. With the energization, the electromagnetic coils are magnetized to form an alternating magnetic field. The alternating magnetic field and the magnetic field generated by the permanent magnets repel each other. Alternatively, the two magnetic fields attract each other. The above repulsion and attraction cause the rotor to rotate.

For example, the motor applies a rotational driving force to a rotary body. If the rotating body is a propeller of a flying object, the motor is required to have performance capable of continuously outputting high torque at a low rotational speed during takeoff, hovering, or the like of the flying object. In order to obtain this performance, it is conceivable to increase the size of the motor. However, in this case, the weight of the motor is increased. Therefore, the flying object also becomes large and heavy.

Thus, it has been attempted to obtain high torque while avoiding an increase in size of the motor. For example, in JP 2005-080381 A, a structure is proposed, in which an arc angle of one of teeth portions facing a permanent magnet is defined. In JP 2005-080381 A, a motor having 16 permanent magnets and 18 teeth portions are illustrated. In this case, the number of teeth portions facing the N pole or the S pole of one permanent magnet is substantially one.

Also in JP 2007-151332 A and JP 2007-209197 A, a structure for causing a motor to produce high torque has been proposed.

SUMMARY OF THE INVENTION

In order to further reduce the size or weight of a flying object or the like, it is required to further reduce the size of a motor. In the flying object, however, it is necessary to obtain high torque when the rotational speed of a propeller is low.

When trying to obtain high torque in the case of a low rotational speed, a bearing for supporting a rotating shaft tends to be large. Along with such a configuration, the inner diameter of the rotor tends to be large as well. In this case, the outer diameter of the rotor has to be large in order to maintain predetermined magnetic flux density or the like. However, at the same time, the rotary electric machine becomes large. Due to such reasoning, it is not easy to reduce the size of a rotary electric machine in which high torque can be obtained.

An object of the present invention is to solve the above-described problems.

According to an embodiment of the present invention, there is provided a rotary electric machine including a stator including a yoke portion having an annular shape and a plurality of teeth portions configured to protrude from an inner circumferential edge of the yoke portion in a radially inward direction of the yoke portion, slots each being formed between adjacent ones of the plurality of teeth portions, and a rotor disposed inside the stator and facing toward the plurality of teeth portions, wherein the rotor includes a rotor core configured to retain permanent magnets with a number of poles of 16 to 32, and a rotating shaft configured to rotate integrally with the rotor core, the rotor core is a stacked body of the plurality of electromagnetic steel sheets, each of the plurality of electromagnetic steel sheets is formed with a first insertion hole in which the rotating shaft is disposed, a plurality of through holes formed radially outward of the first insertion hole, and a plurality of second insertion holes formed radially outward of the plurality of through holes, the permanent magnets being inserted into the second insertion holes, each of the plurality of electromagnetic steel sheets includes an inner annular portion located between the first insertion hole and the plurality of through holes, an outer annular portion located radially outward of the plurality of through holes and including the plurality of second insertion holes formed therein, and a plurality of coupling portions configured to couple the inner annular portion with the outer annular portion, when a rotor inner diameter is defined as twice a distance from a center of the first insertion hole to an inner circumferential edge of the inner annular portion, and a rotor outer diameter is defined as twice a distance from the center of the first insertion hole to an outer circumferential edge of the outer annular portion, a ratio of the rotor inner diameter to the rotor outer diameter is within a range of 1:1.5 to 1:3.5.

In the present invention, a ratio of the rotor inner diameter to the rotor outer diameter is determined to be within a range of 1:1.5 to 1:3.5. Therefore, an increase in the size of the rotary electric machine is avoided. On the other hand, in the present invention, the number of poles is determined to be 16 to 32. Stated otherwise, the number of poles is large. Therefore, even in the case that the ratio of the rotor inner diameter to the rotor outer diameter is so small that it is within a range of 1:1.5 to 1:3.5, it is possible to obtain sufficient magnetic flux density. Therefore, it is possible to obtain high torque while reducing the size of the rotary electric machine.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
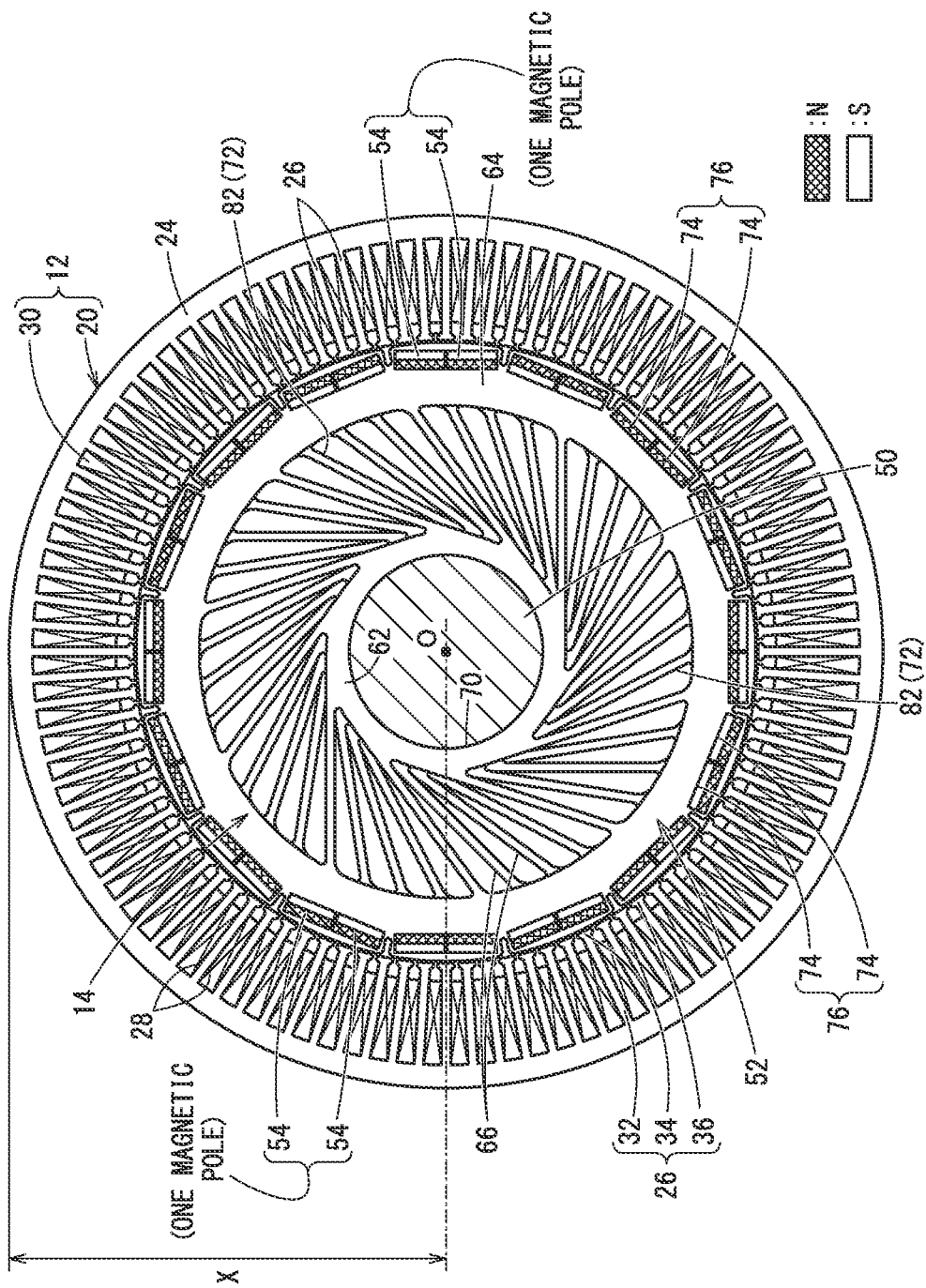
FIG. 1 is a schematic horizontal cross-sectional view of principal components of a rotary electric machine according to an embodiment of the present invention.

FIG. 1 is a schematic horizontal cross-sectional view of principal components of a rotary electric machine 10 according to a present embodiment. The rotary electric machine 10 includes a stator 12 having a substantially annular shape and a rotor 14 disposed inside the stator 12. The rotary electric machine 10 is, for example, a three-phase motor having a U phase, a V phase, and a W phase.

Initially, the stator 12 will be described. The stator 12 includes a stator core 20. The stator core 20 is, for example, a stacked body in which magnetic bodies such as electromagnetic steel sheets are stacked.

The stator core 20 includes a yoke portion 24 and a plurality of teeth portions 26. In the present embodiment, an outer diameter of the rotary electric machine 10 is within a range of 230 mm to 450 mm. This outer diameter is smaller than the outer diameter of a general motor that rotates a propeller of a flying object. That is, the rotary electric machine 10 is small in scale. The outer diameter corresponds to twice a distance X from a center O of a rotating shaft 50 to an outer circumferential edge of the yoke portion 24.

The yoke portion 24 has an annular shape. Each of the teeth portions 26 protrudes inwardly in a radial direction of the yoke portion 24 from an inner circumferential edge of the yoke portion 24.

Slots 28 are formed between adjacent ones of teeth portions 26. In the case where the rotary electric machine 10 is a three-phase motor, the number of slots 28 is typically a multiple of three. In the example shown in FIG. 1, both the number of teeth portions 26 and the number of slots 28 are 96. The number of poles (to be described later) is 16. Therefore, the rotary electric machine 10 is configured in the form of a so-called 16-pole 96-slot rotary electric machine. Electromagnetic coils 30 are provided in the slots 28. Each of the electromagnetic coils 30 includes, for example, a wire made of copper. The electromagnetic coils 30 are obtained by winding the wire around the teeth portions 26.

Figure 2:
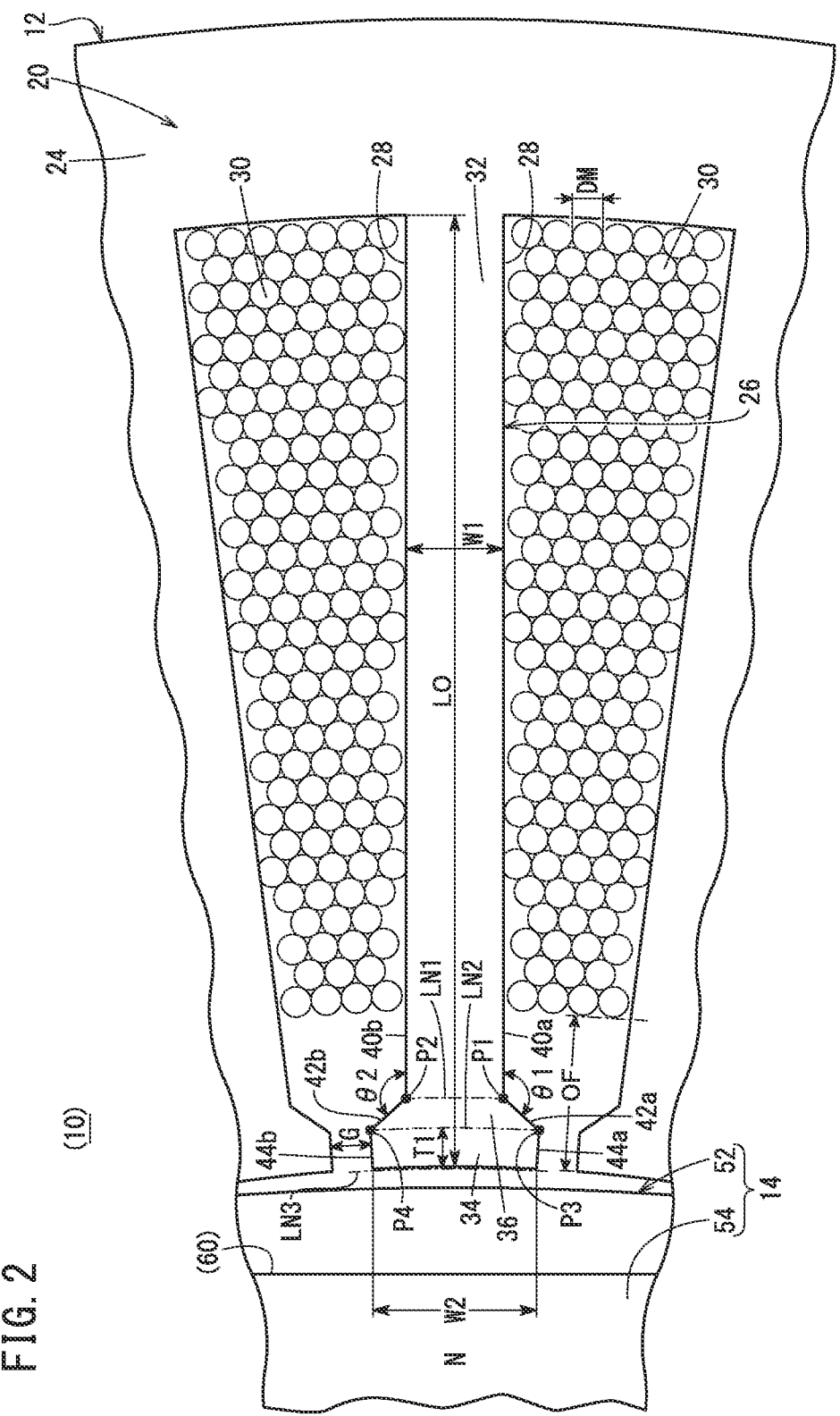
FIG. 2 is an enlarged view of principal components shown in FIG. 1.

FIG. 2 is an enlarged view of principal components shown in FIG. 1. Each of the teeth portions 26 includes a base portion 32, a flange portion 34, and an expanding portion 36. The base portion 32 extends radially in a radial direction of the stator core 20. The flange portion 34 is provided at an inner-circumferentially distal end of each of the teeth portions 26. The expanding portion 36 is interposed between the base portion 32 and the flange portion 34.

The base portion 32 has a first parallel side 40a and a second parallel side 40b. A separation distance W1 between the first parallel side 40a and the second parallel side 40b can be rephrased as a width of the base portion 32. The widthwise direction is substantially orthogonal to the radial direction of the stator core 20.

The expanding portion 36 expands in a manner so as to gradually widen from the base portion 32 toward the flange portion 34. Stated otherwise, the expanding portion 36 is formed in a tapered shape toward the base portion 32. The expanding portion 36 has a first inclined side 42a and a second inclined side 42b. The first inclined side 42a intersects the first parallel side 40a of the base portion 32 at an intersection angle θ1. Similarly, the second inclined side 42b intersects the second parallel side 40b at an intersection angle θ2. In the present embodiment, the intersection angle θ1 and the intersection angle θ2 are within a range of 108° to 130°. More preferably, the intersection angle θ1 and the intersection angle θ2 are in a range of 120° to 125°. By setting the intersection angle θ1 and intersection angle θ2 to lie within such a range, it is possible to reduce a total amount of copper loss and iron loss in the stator 12. It is preferable that the intersection angle θ1 and the intersection angle θ2 be the same. However, the intersection angle θ1 and the intersection angle θ2 may be different from each other.

An intersection of the first parallel side 40a and the first inclined side 42a is defined as P1. An intersection of the second parallel side 40b and the second inclined side 42b is defined as P2. A straight line drawn from the intersection P1 toward the intersection P2 is referred to as a first virtual straight line LN1. The first virtual straight line LN1 indicates an inner circumferential end of the base portion 32. At the same time, the first virtual straight line LN1 indicates an outer circumferential end of the expanding portion 36.

The first inclined side 42a is connected to a first radially directed side 44a of the flange portion 34. The second inclined side 42b is connected to a second radially directed side 44b of the flange portion 34. The first radially directed side 44a and the second radially directed side 44b each have a substantially linear shape and extend mutually in parallel with each other. Hereinafter, a separation distance between the first radially directed side 44a and the second radially directed side 44b is defined as W2. The separation distance W2 is a width of the flange portion 34. The width W2 of the flange portion 34 is greater than the width W1 of the base portion 32.

A separation distance between the adjacent flange portions 34 is defined as G. A diameter of the wire material forming the electromagnetic coils 30 is defined as DM. The width W2 is, for example, a range in which the separation distance G is larger than the diameter DM. In this case, a magnetic flux saturation at the flange portions 34 is reduced. As a result, the base portions 32 can receive a large amount of magnetic flux. Accordingly, it is possible to achieve an enhancement in the rotational torque of the rotating shaft 50. Further, as the material (electromagnetic steel sheets or the like) of the stator core 20, it becomes possible to select magnetic bodies for which the saturation magnetic flux density thereof is small. Therefore, it is possible to achieve a reduction in cost.

An intersection of the first inclined side 42a and the first radially directed side 44a is defined as P3. The intersection point P3 is an outer circumferential end of the first radially directed side 44a (an inner circumferential end of the first inclined side 42a). An intersection between the second inclined side 42b and the second radially directed side 44b is defined as P4. The intersection point P4 is an outer circumferential end of the second radially directed side 44b (an inner circumferential end of the second inclined side 42b). A straight line drawn from the intersection P3 to the intersection P4 is defined as a second virtual straight line LN2. The second virtual straight line LN2 indicates the inner circumferential end of the expanding portion 36 and the outer circumferential end of the flange portion 34.

A straight line drawn from the inner circumferential end of the first radially directed side 44a to the inner circumferential end of the second radially directed side 44b is defined as a third virtual straight line LN3. The third virtual straight line LN3 is an inner circumferential end of the flange portion 34. A separation distance between the third virtual straight line LN3 and the second virtual straight line LN2 is defined as T1. The separation distance T1 indicates a distance from the inner circumferential end of the flange portion 34 to the outer circumferential end of the flange portion 34. Hereinafter, the separation distance T1 is defined as a thickness of the flange portion 34.

A preferable range for the thickness T1 of the flange portion 34 is 0.2 mm to 2.0 mm. A more preferable range for the thickness T1 is 0.3 mm to 1.1 mm. When setting the thickness T1 to lie within such a range, a total amount of copper loss and iron loss in the stator 12 is reduced.

An outer circumferential end of the base portion 32 is connected to an inner circumferential edge of the yoke portion 24. A distance from the outer circumferential end of the base portion 32 to the inner circumferential end of the flange portion 34 is defined as a total length LO (see FIG. 2) of each of the teeth portions 26. In a typical example, the total length LO lies within a range of 40 mm to 45 mm. In a typical example, when the total length LO is set to 100%, the total length of the base portion 32 is typically set to be greater than or equal to 96%. In this case, the distance from the inner circumferential end of the flange portion 34 to the inner circumferential end of the base portion 32 is less than or equal to 4% of the total length LO of each of the teeth portions 26.

In the present embodiment, the electromagnetic coils 30 are made of a metal conductor such as copper. As described above, each of the electromagnetic coils 30 is formed by winding the wire material around the teeth portions 26. In the present embodiment, distributed winding is performed. In FIG. 1, a so-called two winding is illustrated.

As shown in FIG. 2, in a cross section perpendicular to the axial direction of the rotating shaft 50, the inner circumferential end of each of the electromagnetic coils 30 is positioned inside the slot 28. The inner circumferential end of each of the electromagnetic coils 30 is positioned between the inner circumferential end of the flange portion 34 and the outer circumferential end of the base portion 32. The inner circumferential end of each of the electromagnetic coils 30 is offset (or shifted) toward the yoke portion 24 (the outer circumference of the stator core 20). In FIG. 2, the inner circumferential end of each of the electromagnetic coils 30 is positioned between the outer circumferential end of the expanding portion 36 (the inner circumferential end of the base portion 32) and the outer circumferential end of the base portion 32. A distance from an inner circumferential end of the flange portion 34 to the inner circumferential end of each of the electromagnetic coils 30 is defined as an offset amount (shift amount) OF. A preferable range of the offset amount OF is 5% to 11% of the entire length LO of each of the teeth portions 26. For example, when the total length LO is 40 mm, the suitable offset amount OF is 2 mm to 4.4 mm. A more preferable range of the offset amount OF is 5.6% to 10.3% of the entire length LO of each of the teeth portions 26.

If the offset amount OF is less than 5% of the entire length LO of each of the teeth portions 26, the number of times at which each of the electromagnetic coils 30 is wound becomes larger in quantity. Therefore, the volume of the electromagnetic coils 30 becomes large. As a result, the amount of magnetic flux received from permanent magnets 54 of the rotor 14 becomes large in quantity. Therefore, a concern arises in that the amount of heat generated by the electromagnetic coils 30 increases. In addition, the amount of copper loss increases. If the offset amount OF is in excess of 11%, the copper loss becomes small. However, since the exposed area of the base portion 32 becomes large, the iron loss becomes large. As a result, the amount of generated heat becomes high. Further, since the number of times at which each of the electromagnetic coils 30 is wound becomes fewer, the volume of the electromagnetic coils 30 becomes smaller. Therefore, the output of the rotary electric machine 10 as a motor decreases.

When the total length LO of each of the teeth portions 26 is 40 mm to 45 mm, a specific distance from the first virtual straight line LN1 to the inner circumferential end of each of the electromagnetic coils 30 are typically 1 mm to 3 mm. As described above, the first virtual straight line LN1 is the inner circumferential end of the base portion 32 and the outer circumferential end of the expanding portion 36.

The rotor 14 will be described. As shown in FIG. 1, the rotor 14 is disposed inside the teeth portions 26.

The rotor 14 includes the rotating shaft 50, a rotor core 52, and the plurality of (32 in the example of FIG. 1) permanent magnets 54. The rotor core 52 rotates integrally with the rotating shaft 50. The permanent magnets 54 are retained in the rotor core 52. Therefore, when the rotating shaft 50 rotates, the permanent magnets 54 move along the outer circumferential edge of the rotor core 52.

Figure 3:
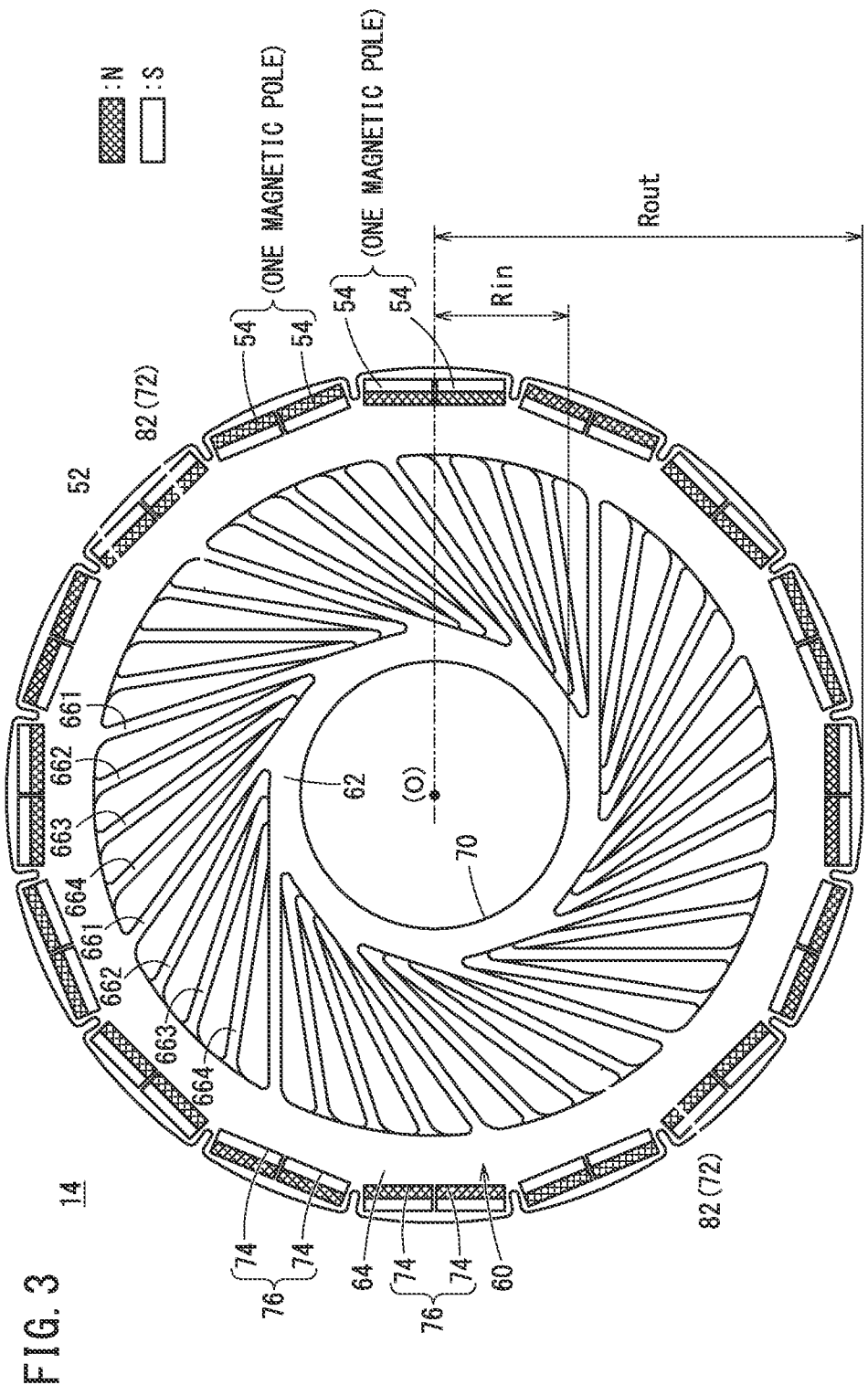
FIG. 3 is an overall schematic plan view of a rotor core.

As shown in FIG. 3, the rotor core 52 includes a plurality of electromagnetic steel sheets 60. The rotor core 52 is formed by stacking the plurality of electromagnetic steel sheets 60. That is, the rotor core 52 is a stacked body of the plurality of electromagnetic steel sheets 60.

Figure 4:
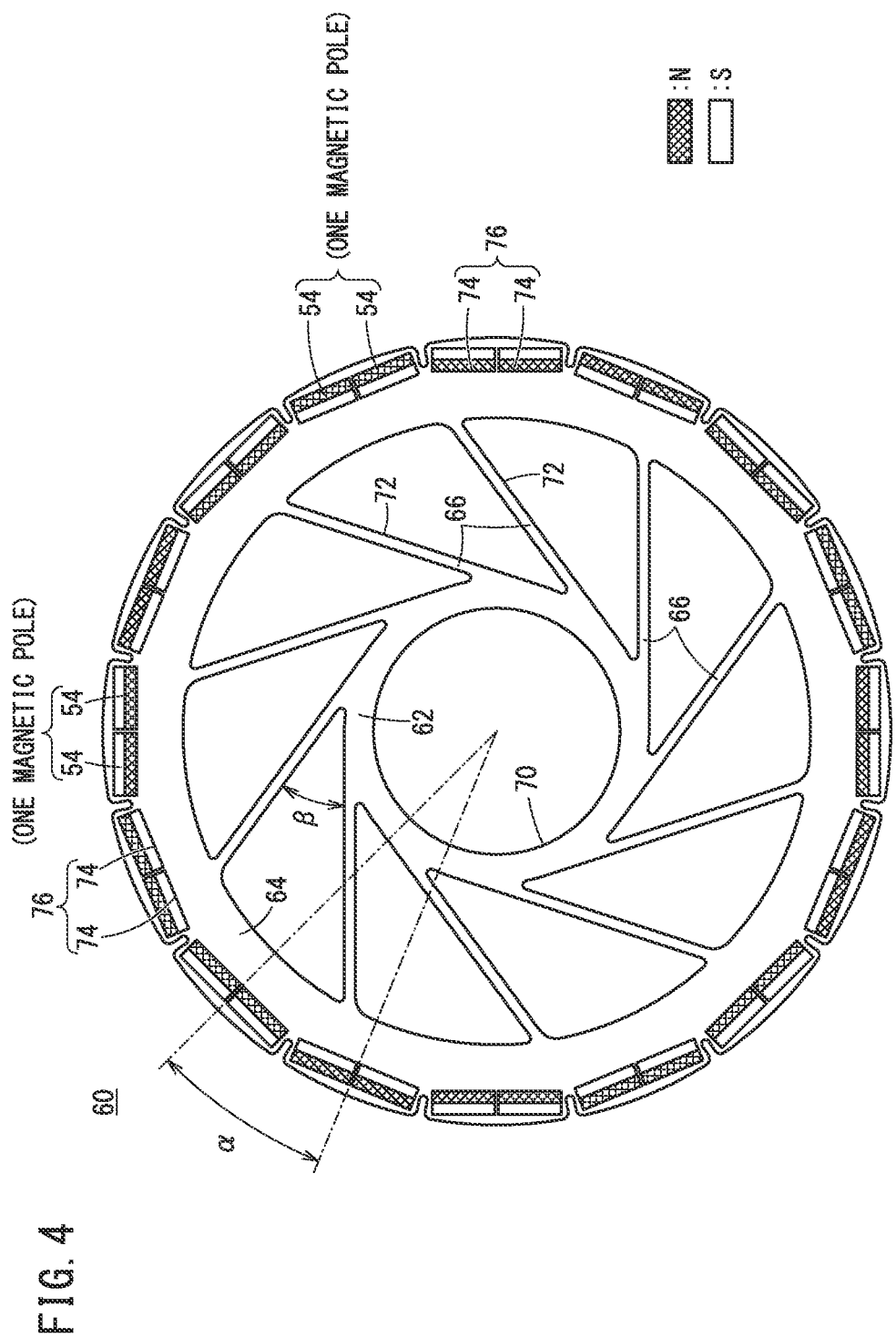
FIG. 4 is an overall schematic plan view of one electromagnetic steel sheet forming the rotor core.

As shown in FIG. 4, one electromagnetic steel sheet 60 is a thin annular body. The electromagnetic steel sheet 60 has an inner annular portion 62 located near an inner circumference and an outer annular portion 64 located near an outer circumference. The inner annular portion 62 and the outer annular portion 64 have a substantially annular shape and are concentric circles. The inner annular portion 62 and the outer annular portion 64 are coupled via a plurality of (ten in the example of FIG. 4) coupling portions 66. In this way, the coupling portions 66 connect the outer circumferential edge of the inner annular portion 62 and the inner circumferential edge of the outer annular portion 64.

A circular first insertion hole 70 is formed in the inner annular portion 62. The rotating shaft 50 shown in FIG. 1 is passed through the first insertion hole 70. The center O of the rotating shaft 50 coincides with a center of the first insertion hole 70.

If a distance from the center O to an inner circumferential edge of the inner annular portion 62 is Rin (see FIG. 3), twice the distance Rin is an inner diameter of the rotor core 52. If a distance from the center O to an outer circumferential edge of the outer annular portion 64 is defined as Rout, twice the distance Rout is an outer diameter of the rotor core 52. Hereinafter, the inner diameter of the rotor core 52 will be referred to as a "rotor inner diameter", and the outer diameter of the rotor core 52 will be referred to as a "rotor outer diameter". The rotor outer diameter is larger than the rotor inner diameter.

The rotor outer diameter is preferably 1.5 to 3.5 times as large as the rotor inner diameter. That is, a ratio of the rotor inner diameter to the rotor outer diameter is preferably within a range of 1:1.5 to 1:3.5. In this case, Rin:Rout=1:1.5 to 3.5 is established.

Through holes 72 are formed between adjacent ones of the coupling portions 66. A plurality of second insertion holes 74 (32 holes in the example of FIG. 4) are formed in the outer annular portion 64. Each of the second insertion holes 74 has a rectangular shape. Two of the second insertion holes 74 are adjacent to each other and make a pair. Hereinafter, one pair of the second insertion holes 74 (two second insertion holes 74 adjacent to each other) is referred to as a "hole group 76". A separation distance between the adjacent hole groups 76 is larger than a separation distance between the second insertion holes 74 in one hole group 76. In this case, the separation angle (phase difference) α between adjacent hole groups 76 is 22.5°.

The permanent magnets 54 are inserted into the second insertion holes 74, respectively. Since the number of the second insertion holes 74 is 32, the number of the permanent magnets 54 is also 32. The two permanent magnets 54 are inserted into one of the hole groups 76 such that the same magnetic pole faces toward the outer circumference. In FIG. 3, the N poles of the permanent magnets 54 are shown with a mesh. On the other hand, the S poles are shown without a mesh (blank). The same also applies to the following drawings.

As understood from FIG. 3, in one of the hole groups 76, the N poles of the two permanent magnets 54 face toward the outer circumference. In this case, in hole groups 76 adjacent to the above-mentioned hole group 76, the S poles of the two permanent magnets 54 face toward the outer circumference. In the following description, when simply referred to as "N pole(s)" or "S pole(s)", it mentions a magnetic pole or magnetic poles facing toward the outer circumference. In the stator 12, two S poles are interposed between two N poles and two other N poles.

Hereinafter, the same magnetic poles facing toward the outer circumference, of the two permanent magnets 54 accommodated in one of the hole groups 76, are counted as one magnetic pole. That is, the two N poles in one hole group 76 are regarded as one magnetic pole. Similarly, the two S poles in another hole group 76 are also regarded as one magnetic pole. In the present embodiment, sixteen hole groups 76 are formed. Therefore, the number of magnetic poles is 16. In this manner, the rotary electric machine 10 is a 16-pole three-phase motor. In this specification, the number of magnetic poles obtained in this manner is defined as the "number of poles".

One coupling portion 66 extends from the outer circumferential edge of the inner annular portion 62 to the inner circumferential edge of the outer annular portion 64. The extending direction of each of the coupling portions 66 is a direction inclined with respect to a diameter of the electromagnetic steel sheet 60. In the illustrated example (FIG. 4), the number of coupling portions 66 is ten. Therefore, an intersection angle β between the adjacent coupling portions 66 is 36°.

However, the number of the coupling portions 66 is not limited to ten. Therefore, the intersection angle β is not limited to 36°. A preferable number of the coupling portions 66 is 10 to 30. A preferable range of the intersection angle β is 12° to 36°. When the intersection angle β is within such a range, the coupling portions 66 exhibit sufficient rigidity. Therefore, the coupling portions 66 are prevented from being bent by the total weight of the outer annular portion 64 and the permanent magnets 54.

In particular, it is preferable to increase the number of the coupling portions 66 as the number of the permanent magnets 54 (or the number of poles) increases. For example, when the number of poles is 32, it is preferable to set the number of coupling portions 66, to 30. In this case, the intersection angle β between the adjacent coupling portions 66 is 12°. When the number of poles is 24, the number of the coupling portions 66 is preferably 18. In this case, the intersection angle β between the adjacent coupling portions 66 is 20°.

Figure 5:
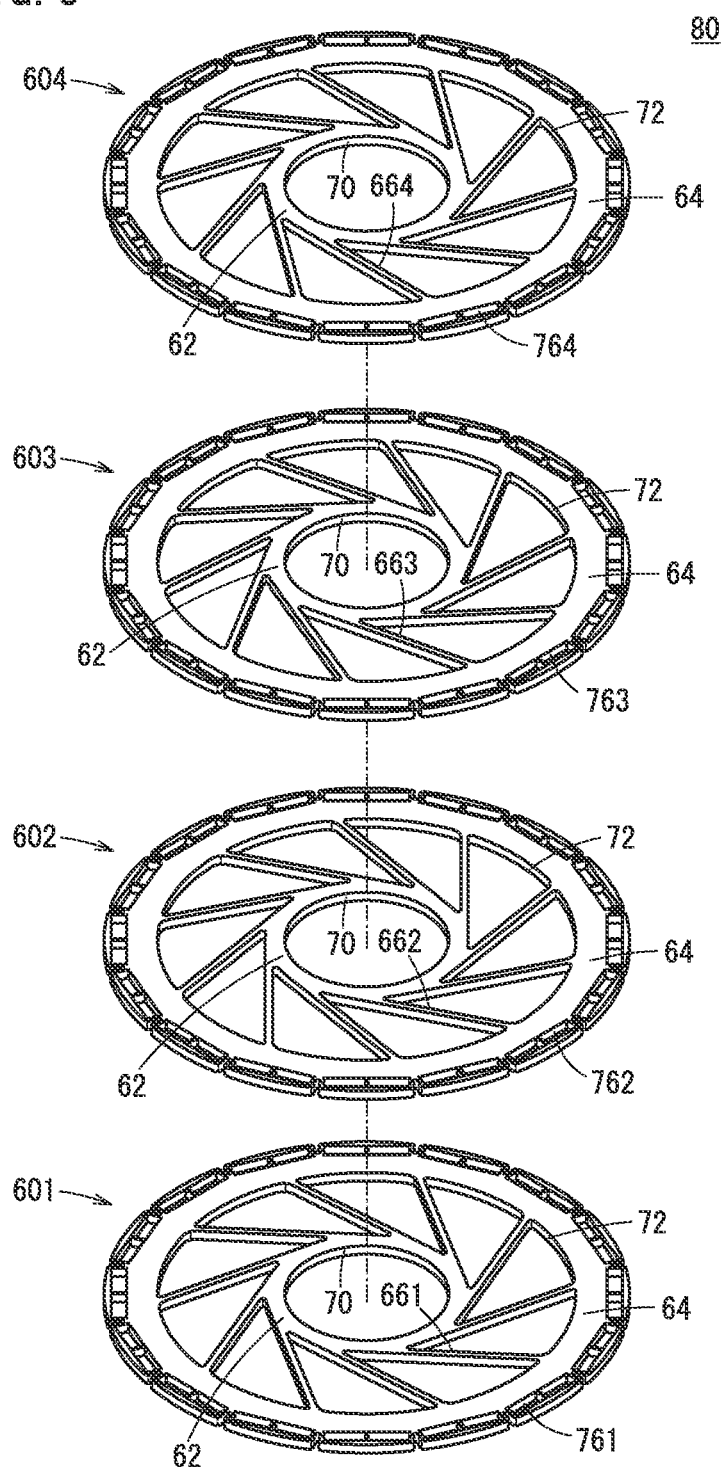
FIG. 5 is an exploded perspective view of principal components of the rotor core.

FIG. 5 is an exploded perspective view of principal components of the rotor core 52. In FIG. 5, four electromagnetic steel sheets 60 are shown. For easy understanding, a lowermost electromagnetic steel sheet 60 in FIG. 5 is referred to as a first electromagnetic steel sheet 601. Each of the hole groups 76 of the first electromagnetic steel sheet 601 is referred to as a first hole group 761, and each of the coupling portions 66 of the first electromagnetic steel sheet 601 is referred to as a first coupling portion 661. The electromagnetic steel sheet 60 stacked immediately above the first electromagnetic steel sheet 601 is referred to as a second electromagnetic steel sheet 602. Each of the hole groups 76 of the second electromagnetic steel sheet 602 is referred to as a second hole group 762, and each of the coupling portions 66 of the second electromagnetic steel sheet 602 is referred to as a second coupling portion 662. The electromagnetic steel sheet 60 stacked immediately above the second electromagnetic steel sheet 602 is referred to as a third electromagnetic steel sheet 603. Each of the hole groups 76 of the third electromagnetic steel sheet 603 is referred to as a third hole group 763, and each of the coupling portions 66 of the third electromagnetic steel sheet 603 is referred to as a third coupling portion 663. The electromagnetic steel sheet 60 stacked immediately above the third electromagnetic steel sheet 603 is referred to as a fourth electromagnetic steel sheet 604. Each of the hole groups 76 of the fourth electromagnetic steel sheet 604 is referred to as a fourth hole group 764, and each of the coupling portions 66 of the fourth electromagnetic steel sheet 604 is referred to as a fourth coupling portion 664.

The second electromagnetic steel sheet 602 is stacked on the first electromagnetic steel sheet 601 in a state of being rotated by 45° with respect to the first electromagnetic steel sheet 601. In this case, a phase difference of 9° is generated between the first coupling portions 661 and the second coupling portions 662. Moreover, the first hole groups 761 and the second hole groups 762 overlap with each other. In other words, the first hole groups 761 and the second hole groups 762 are connected to each other.

The third electromagnetic steel sheet 603 is stacked on the second electromagnetic steel sheet 602 in a state of being rotated by 45° with respect to the second electromagnetic steel sheet 602 and being rotated by 90° with respect to the first electromagnetic steel sheet 601. In this case, a phase difference of 9° is generated between the second coupling portions 662 and the third coupling portions 663, and a phase difference of 18° is generated between the first coupling portions 661 and the third coupling portions 663. The third hole groups 763 are connected to the first hole groups 761 and the second hole groups 762.

The fourth electromagnetic steel sheet 604 is stacked on the third electromagnetic steel sheet 603 in a state of being rotated by 45° with respect to the third electromagnetic steel sheet 603, rotated by 90° with respect to the second electromagnetic steel sheet 602, and rotated by 135° with respect to the first electromagnetic steel sheet 601. In this case, a phase difference of 9° occurs between the third coupling portions 663 and the fourth coupling portions 664, a phase difference of 18° occurs between the second coupling portions 662 and the fourth coupling portions 664, and a phase difference of 27° occurs between the first coupling portions 661 and the fourth coupling portions 664. The fourth hole groups 764 are connected to the first hole groups 761, the second hole groups 762, and the third hole groups 763.

A combination of the first to fourth electromagnetic steel sheets 601 to 604 is defined as one sheet group 80. On one sheet group 80, another sheet group 80 is stacked. Therefore, immediately above the fourth electromagnetic steel sheet 604 in one sheet group 80, the first electromagnetic steel sheet 601 in another sheet group 80 is stacked. When the rotor 14 is viewed in an axial direction of the rotor 14, the positions of the first hole groups 761 and the first coupling portions 661 in the first electromagnetic steel sheet 601 in the lower sheet group 80 correspond to (overlap with each other) the positions of the first hole groups 761 and the first coupling portions 661 in the first electromagnetic steel sheet 601 in the upper sheet group 80.

When the rotor 14 is viewed in the axial direction of the rotor 14, all of the first hole groups 761, the second hole groups 762, the third hole groups 763, and the fourth hole groups 764 are continuous. The permanent magnets 54 are inserted into all the hole groups 76 in a stacking direction of the electromagnetic steel sheets 60. Further, all the inner annular portions 62 of the first to fourth electromagnetic steel sheets 601 to 604 overlap with each other.

On the other hand, when the rotor 14 is viewed in the axial direction of the rotor 14, one of the second coupling portions 662, one of the third coupling portions 663, and one of the fourth coupling portions 664 are interposed between the adjacent first coupling portions 661. Clearances are formed between the first coupling portions 661 and the second coupling portions 662. Clearances are also formed between the second coupling portions 662 and the third coupling portions 663. Clearances are also formed between the third coupling portions 663 and the fourth coupling portions 664. Clearance are also formed between the fourth coupling portions 664 and the first coupling portions 661. Therefore, the through holes 72 between the adjacent first coupling portions 661 are not blocked by the second coupling portions 662, the third coupling portions 663, and the fourth coupling portions 664.

Accordingly, in the rotor core 52, the through holes 72 partially overlap with each other in the stacking direction of the electromagnetic steel sheets 60. As shown in FIG. 3, flow passages 82 (through holes 72) in the stacking direction of the electromagnetic steel sheets 60 are formed in the rotor core 52, based on the through holes 72 being continuous in this manner.

Figure 6:
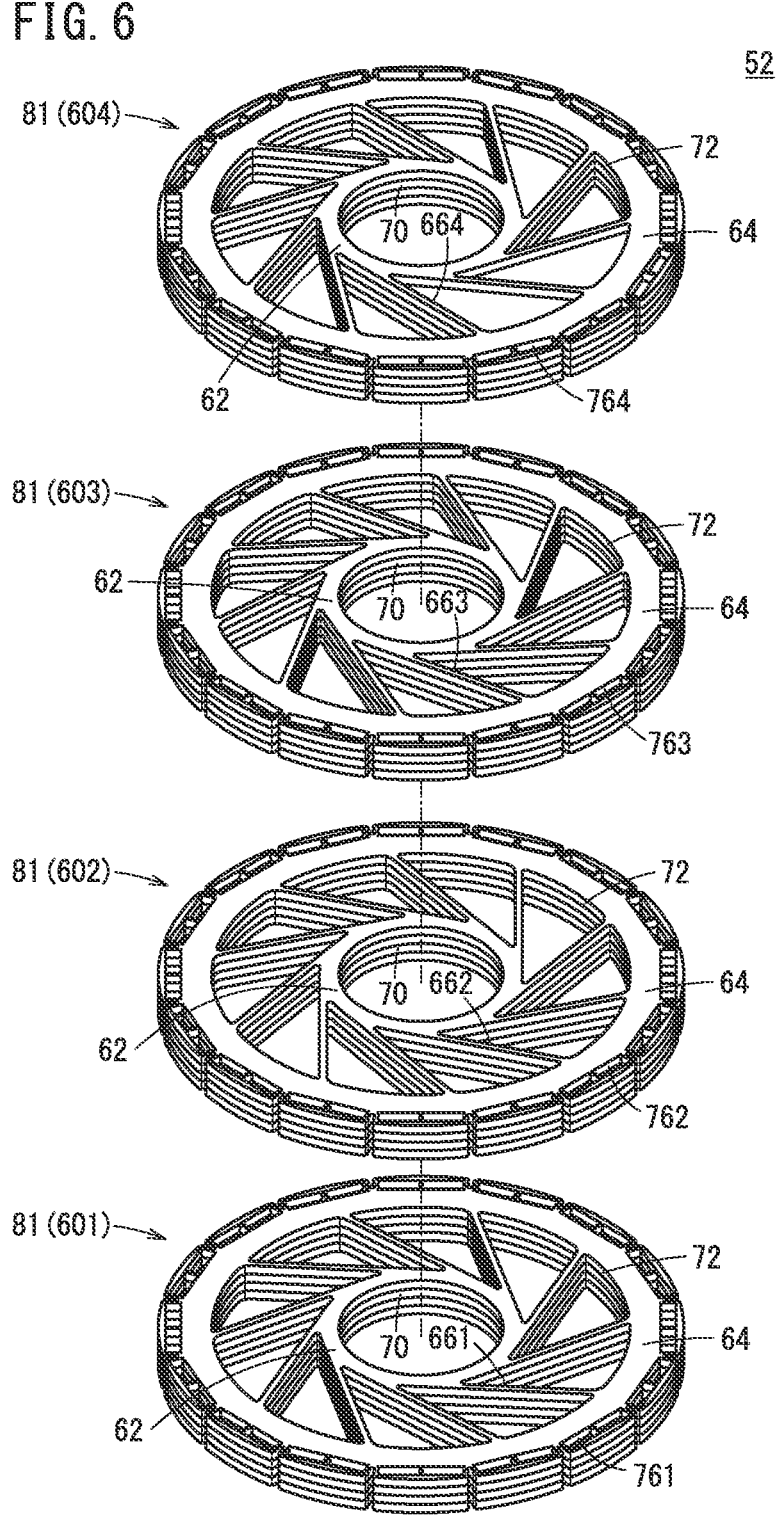
FIG. 6 is an exploded perspective view of principal components of another rotor core.

As shown in FIG. 6, a plurality of electromagnetic steel sheets 60 may be stacked in a phase in which all the coupling portions 66 overlap with each other to provide one sheet group 81. In this case, when another sheet group 81 is stacked directly on the one sheet group 81, the phase is set such that the coupling portions 66 of the lower sheet group 81 and the coupling portions 66 of the upper sheet group 81 do not overlap with each other. For example, a phase difference of 9° is provided between the coupling portions 66 of the lower sheet group 81 and the coupling portions 66 of the upper sheet group 81. The sheet group 81 to be stacked next also has a phase (a phase difference of 9°) in which the coupling portions 66 of the sheet group 81 do not overlap with the coupling portions 66 of the two sheet groups 81 that have already been stacked. The sheet group 81 to be stacked next also has a phase (a phase difference of 9°) in which the coupling portions 66 of the sheet group 81 do not overlap with the coupling portions 66 of the three sheet groups 81 that have already been stacked. The above stacking may be repeated. In either case, the shape shown in FIG. 3 is obtained when the rotor 14 is viewed in the axial direction of the rotor 14. That is, the rotor core 52 is obtained.

The two permanent magnets 54 provided in one hole group 76 are regarded as either the N pole or S pole as described above. That is, the number of poles of the permanent magnets 54 in one hole group 76 is one. The two permanent magnets 54 face toward the base portions 32 via the flange portions 34. In the present embodiment, the number of poles is 16, and the number of teeth portions 26 is 96. Therefore, the average number of the teeth portions 26 for one magnetic pole (in the present embodiment, two permanent magnets 54 provided in one hole group 76) is six.

Since the number of teeth portions 26 is 96, the number of slots 28 is also 96. Therefore, the average number of slots 28 for one magnetic pole of is also six (see FIG. 7). In this way, the average number of teeth portions 26 or slots 28 for one magnetic pole is obtained by calculation.

Figure 7:
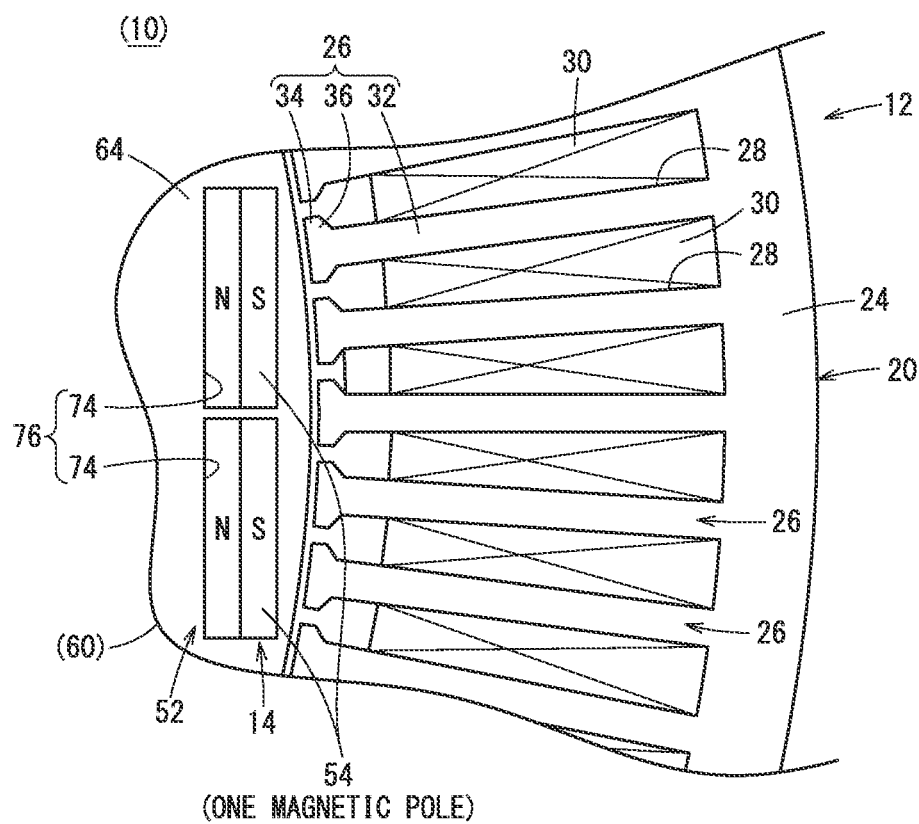
FIG. 7 is an enlarged view of principal components shown in FIG. 1.

FIG. 7 shows the moment when one magnetic pole (two permanent magnets 54 provided in one hole group 76) faces toward six slots 28. In this case, about half of one of teeth portions 26 faces toward the lower S pole, and about half of another of teeth portions 26 faces toward the upper S pole. In addition, all of five teeth portions 26 face toward the two S poles. Therefore, also in this case, the average number of the teeth portions 26 facing toward the two S poles is six.

When the rotor 14 is slightly rotated from the state shown in FIG. 7, the entire six teeth portions 26 faces between the two permanent magnets 54 provided in the hole group 76. Also, about half of a slot 28 faces toward the lower S pole, and about half of another slot 28 faces toward the upper S pole. In addition, all of five slots 28 face two S poles. Therefore, also in this case, the average number of slots 28 facing toward the two S poles is six.

The rotor 14 includes the rotating shaft 50. The rotating shaft 50 is rotatably supported by a support member (not shown). The rotating shaft 50 is provided with a bearing (not shown). The bearing is interposed between the rotating shaft 50 and the support member.

A rotating body (not shown) is attached to a distal end of the rotating shaft 50. The rotating shaft 50 and the rotating body may be coupled via a gear or the like. In either case, as the electromagnetic coils 30 are energized and the rotating shaft 50 rotates, the rotating body rotates. The rotating body is, for example, a propeller or the like.

The rotary electric machine 10 according to the present embodiment is basically configured in the manner described above. Next, operations and effects of the rotary electric machine 10 will be described.

As described above, the rotor core 52 is formed by stacking the plurality of electromagnetic steel sheets 60. The through holes 72 are formed in each of the electromagnetic steel sheets 60. Therefore, the individual electromagnetic steel sheets 60 are lightweight. Accordingly, the rotor core 52 is made lightweight. Therefore, the rotary electric machine 10 is also made lightweight.

As described above, in the present embodiment, the outer diameter of the rotary electric machine 10 is 450 mm at a maximum. That is, the rotary electric machine 10 is relatively small. Thus, according to the present embodiment, the rotary electric machine 10 can be made small in scale and lightweight.

The rotary electric machine 10 is used as, for example, a rotary drive source of a propeller of a flying object. In this case, the rotary electric machine 10 is used as a three-phase motor.

In order to drive the rotary electric machine 10 as a three-phase motor, the electromagnetic coils 30 are energized. Upon energization, the electromagnetic coils 30 form an alternating magnetic field. The alternating magnetic field repels or attracts the magnetic field of the permanent magnets 54. Accordingly, the rotating shaft 50 and the rotor core 52 integrally rotate. Therefore, the permanent magnets 54 move along the outer edge of the rotor core 52 so as to draw a circle.

In order to obtain a high torque when the rotational speed of the rotating shaft 50 is low, it is necessary to use a bearing having a large diameter. The rotor inner diameter is determined to be a size to support large diameter bearings. Here, when a ratio of the rotor inner diameter to the rotor outer diameter is within the range of 1:1.5 to 1:3.5, an increase in the diameter of the electromagnetic steel sheets 60 (the diameter of the rotor 14) is suppressed. Therefore, in this case, the rotor 14 can support a bearing having a large diameter while being compact.

Each of the electromagnetic steel sheets 60 of the rotor core 52 has the coupling portions 66. The intersection angle β between the adjacent coupling portions 66 is within a range of 12° to 36°. Thus, an appropriate number of the coupling portions 66 is determined. Therefore, the outer annular portion 64 is sufficiently supported by the inner annular portion 62 via the coupling portions 66. Thus, the rotor core 52 can retain a large number of permanent magnets 54. In other words, the number of poles can be increased. Therefore, the rotational torque of the rotating shaft 50 can be increased.

In the example of FIG. 1, the number of poles of the magnetic poles is 16, and the number of slots 28 is 96. Therefore, the number of slots 28 facing toward one magnetic pole (two permanent magnets 54 inserted into one hole group 76) is six. As described above, in the present embodiment, the number of slots 28 facing toward one magnetic pole is appropriately determined. Thus, although a diameter of the rotary electric machine 10 is relatively small, the rotational torque of the rotating shaft 50 is increased. That is, although the rotary electric machine 10 is a compact and lightweight three-phase motor, the rotary electric machine 10 can apply a large rotational driving force to a rotary body such as a propeller.

Moreover, in this case, leakage of magnetic flux is reduced. As a result, interlinkage magnetic flux of the electromagnetic coils 30 is reduced. Therefore, eddy currents in the electromagnetic coils 30 are reduced, and generation of heat in the electromagnetic coils 30 is suppressed.

Further, in each of the teeth portions 26, the intersection angles θ1 and θ2 between the base portion 32 and the expanding portion 36 are within a range of 108° to 130°. The thickness T1 of the flange portion 34 is within a range of 0.2 mm to 2.0 mm. An offset amount OF of each of the electromagnetic coils 30 with respect to each of the teeth portions 26 is within a range of 5 to 11%. By setting the intersection angle θ, the thickness T1, and the offset amount OF to lie within such ranges, it is possible to reduce a total amount of iron loss and copper loss in the stator 12. Therefore, generation of heat in the stator 12 is suppressed.

Further, by appropriately setting the offset amount OF, the leakage of magnetic flux is reduced. As a result, for example, it is possible to prevent the teeth portions 26, the electromagnetic coils 30, and the like from causing a local rise in temperature. Therefore, deterioration of the material (electromagnetic steel sheet 60 or the like) of the stator core 20 or the material (copper or the like) of the electromagnetic coils 30 due to such a rise in temperature is suppressed.

In the foregoing manner, according to the present embodiment, it is possible to cause an enhancement in the rotational torque of the rotating shaft 50 while making the rotary electric machine 10 small in scale and lightweight. Therefore, when the rotary electric machine 10 is used as a motor, high torque can be continuously output. Moreover, as described above, generation of heat in the rotary electric machine 10 is suppressed.

A coolant (for example, cooling air) is supplied to the rotary electric machine 10. A portion of the coolant passes between the stator core 20 and the rotor core 52. Another portion of the coolant passes through the flow passages 82 (through holes 72) formed in the rotor core 52. As described above, the rotary electric machine 10 is cooled.

In the rotor core 52, a phase difference is provided between one electromagnetic steel sheet 60 and another electromagnetic steel sheet 60 stacked immediately above. Therefore, in the two stacked electromagnetic steel sheets 60, a phase difference also occurs between the through holes 72. Therefore, in the rotor core 52, concentration or stagnation of the coolant in one of the flow passages 82 is avoided. In other words, the coolant is substantially evenly distributed to the plurality of flow holes, and then the distributed coolant easily flows through the individual flow holes. Therefore, the entire rotary electric machine 10 is efficiently and substantially uniformly cooled.

While the rotor core 52 is rotating, stress acts on the rotor core 52. Here, in the two stacked electromagnetic steel sheets 60, a phase difference is also caused between the coupling portions 66. For this reason, the stress is dispersed between the coupling portions 66 in which the phase difference is caused. Therefore, it is possible to avoid concentration of stress on any of the coupling portions 66. For this reason, the durability of the coupling portions 66 is improved.

As described above, the present embodiment discloses the rotary electric machine (10) including the stator (12) including the yoke portion (24) having an annular shape and the plurality of teeth portions (26) configured to protrude from the inner circumferential edge of the yoke portion in a radially inward direction of the yoke portion, the slots (28) each being formed between adjacent ones of the plurality of teeth portions, and the rotor (14) disposed inside the stator and facing toward the plurality of teeth portions, wherein the rotor includes the rotor core (52) configured to retain the permanent magnets (54) with the number of poles of 16 to 32, and the rotating shaft (50) configured to rotate integrally with the rotor core, the rotor core is the stacked body of the plurality of electromagnetic steel sheets (60), each of the plurality of electromagnetic steel sheets is formed with the first insertion hole (70) in which the rotating shaft is disposed, the plurality of through holes (72) formed radially outward of the first insertion hole, and the plurality of second insertion holes (74) formed radially outward of the plurality of through holes, the permanent magnets being inserted into the second insertion holes, each of the plurality of electromagnetic steel sheets includes the inner annular portion (62) located between the first insertion hole and the plurality of through holes, the outer annular portion (64) located radially outward of the plurality of through holes and including the plurality of second insertion holes formed therein, and the plurality of coupling portions (66) configured to couple the inner annular portion with the outer annular portion, when the rotor inner diameter is defined as twice the distance (Rin) from the center of the first insertion hole to the inner circumferential edge of the inner annular portion, and the rotor outer diameter is defined as twice the distance (Rout) from the center of the first insertion hole to the outer circumferential edge of the outer annular portion, a ratio of the rotor inner diameter to the rotor outer diameter is within a range of 1:1.5 to 1:3.5.

In this rotary electric machine, a ratio of the rotor inner diameter to the rotor outer diameter is set to be within a range of 1:1.5 to 1:3.5. That is, the difference between the rotor inner diameter and the rotor outer diameter is relatively small. Therefore, an increase in the size of the rotary electric machine is avoided. On the other hand, in this rotary electric machine, the number of poles is determined to be 16 to 32. Stated otherwise, the number of poles is large. Therefore, even in the case that the ratio (or the difference) between the rotor inner diameter and the rotor outer diameter is small, it is possible to obtain sufficient magnetic flux density. Therefore, it is possible to obtain high torque while the size of the rotary electric machine is reduced.

In order to obtain a rotor core having large thickness and being formed of a single member, for example, it is necessary to form the first insertion hole, the through holes, and the second insertion holes by performing a boring process in a cylindrical workpiece. However, it is not easy to perform such a boring process in a workpiece having large thickness. In contrast, in the case that the rotor core is obtained by stacking the electromagnetic steel sheets having the above-described shape, the first insertion hole, the through holes, and the second insertion holes are formed only by stacking the electromagnetic steel sheets.

Each of the electromagnetic steel sheets is obtained by, for example, punching a thin disk-shaped workpiece to form the first insertion hole, the through holes, and the second insertion holes. A punching process for a thin disk-shaped workpiece can be performed more easily than a boring process for a thick workpiece. Therefore, the rotor core can be easily manufactured.

The present embodiment discloses the rotary electric machine wherein the plurality of electromagnetic steel sheets are stacked in the first mode or the second mode.

The first mode is a mode in which, in one electromagnetic steel sheet (601) and another electromagnetic steel sheet (602) that are stacked and adjacent to each other among the plurality of electromagnetic steel sheets, the plurality of coupling portions (661) of the one electromagnetic steel sheet and the plurality of coupling portions (662) of the other electromagnetic steel sheet are located so as not to overlap with each other when the rotor is viewed in an axial direction of the rotor.

The second mode is a mode in which the plurality of sheet groups (81) each including the plurality of electromagnetic steel sheets are stacked in the axial direction, and in one sheet group and another sheet group that are stacked and adjacent to each other among the plurality of sheet groups, the plurality of coupling portions (661) of the one sheet group and the plurality of coupling portions (662) of the other sheet group are located so as not to overlap with each other when the rotor is viewed in the axial direction.

Since the coupling portions do not overlap with each other in the two electromagnetic steel sheets (or two sheet groups) stacked top and bottom, concentration of stress on the coupling portion of any phase is avoided. That is, the stress is appropriately distributed to each of the coupling portions having different phases. Therefore, the durability of the coupling portions is improved.

The present embodiment discloses the rotary electric machine wherein when the stator and the rotor are viewed in the axial direction of the stator, the average number of the slots for one magnetic pole is six.

In this case, the average numbers of slots and teeth portions facing toward one magnetic pole are appropriately determined. Thus, even in the case that the diameter of the rotary electric machine is relatively small, the rotational torque of the rotating shaft is increased. Therefore, in the case that the rotary electric machine is used as a three-phase motor, a large rotational driving force can be applied to the rotary body provided on the rotating shaft, in spite of a compact and lightweight three-phase motor. That is, the rotary electric machine can continuously output high torque.

Moreover, in this case, the leakage of magnetic flux is reduced. As a result, the interlinkage magnetic flux of the electromagnetic coils is reduced. Therefore, eddy currents in the electromagnetic coils are reduced and generation of heat in the electromagnetic coils is suppressed.

In addition, the number of poles and the number of slots are determined as above. In this case, it is possible to obtain a large rotational torque in the rotating shaft while avoiding an excessive increase in the diameter of the rotary electric machine. Therefore, it is possible to obtain a high output motor with a small size.

The present embodiment discloses the rotary electric machine wherein the outer diameter of the stator is within a range of 230 mm to 450 mm. Note that the "outer diameter of the stator" is synonymous with "twice the distance from the center of the rotating shaft to the outer edge of the stator core". Therefore, the "outer diameter of the stator" can be rephrased as the "outer diameter of the rotary electric machine".

The rotary electric machine having such an outer diameter is relatively small. Stated otherwise, the rotary electric machine can continuously output high torque while being compact.

In should be understood that the present invention is not limited to the embodiment described above, and various additional or modified configurations could be adopted therein without departing from the essence and gist of the present invention.

Figure 8:
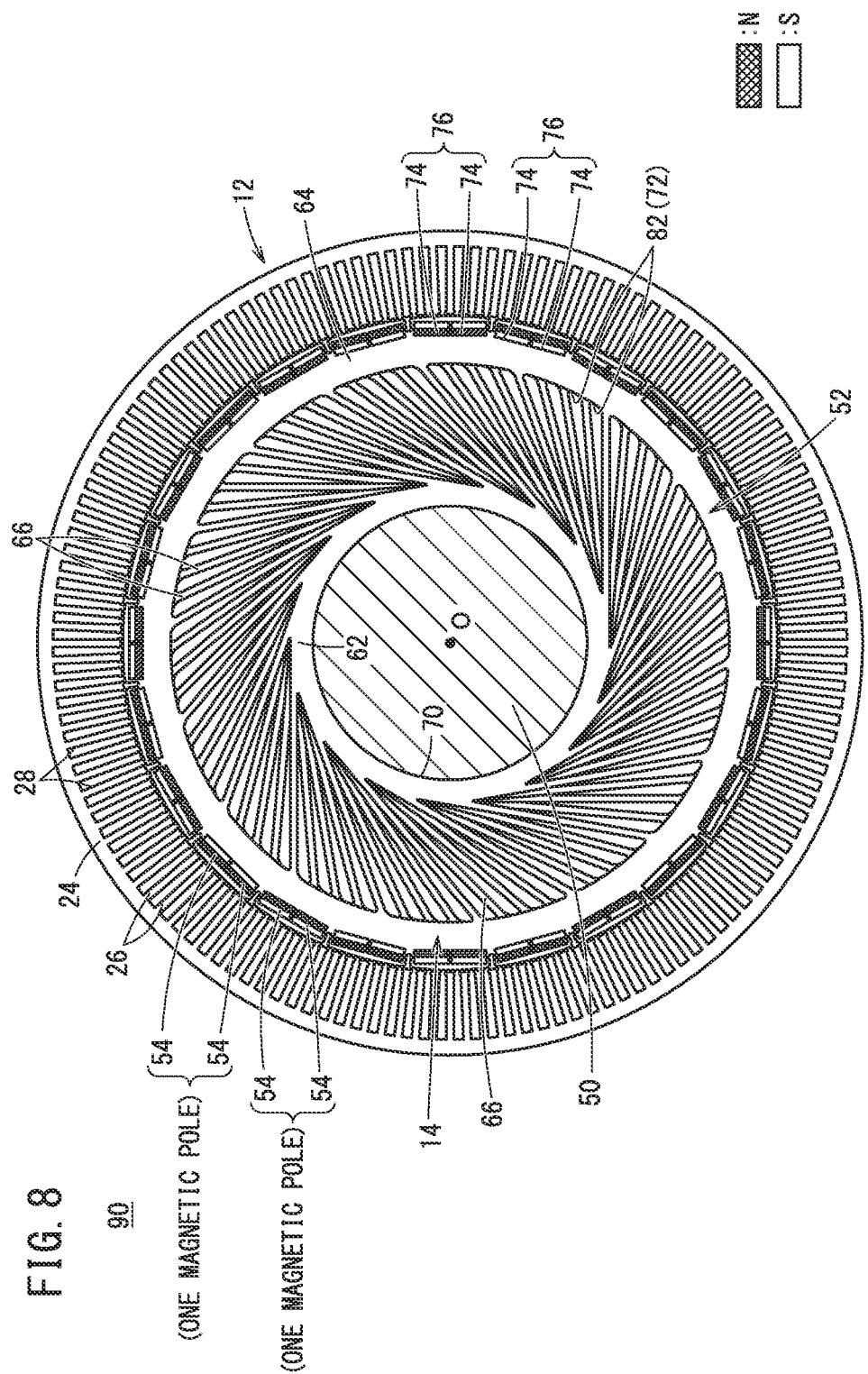
FIG. 8 is a schematic horizontal cross-sectional view of principal components of a rotary electric machine according to another embodiment of the present invention.
Figure 9:
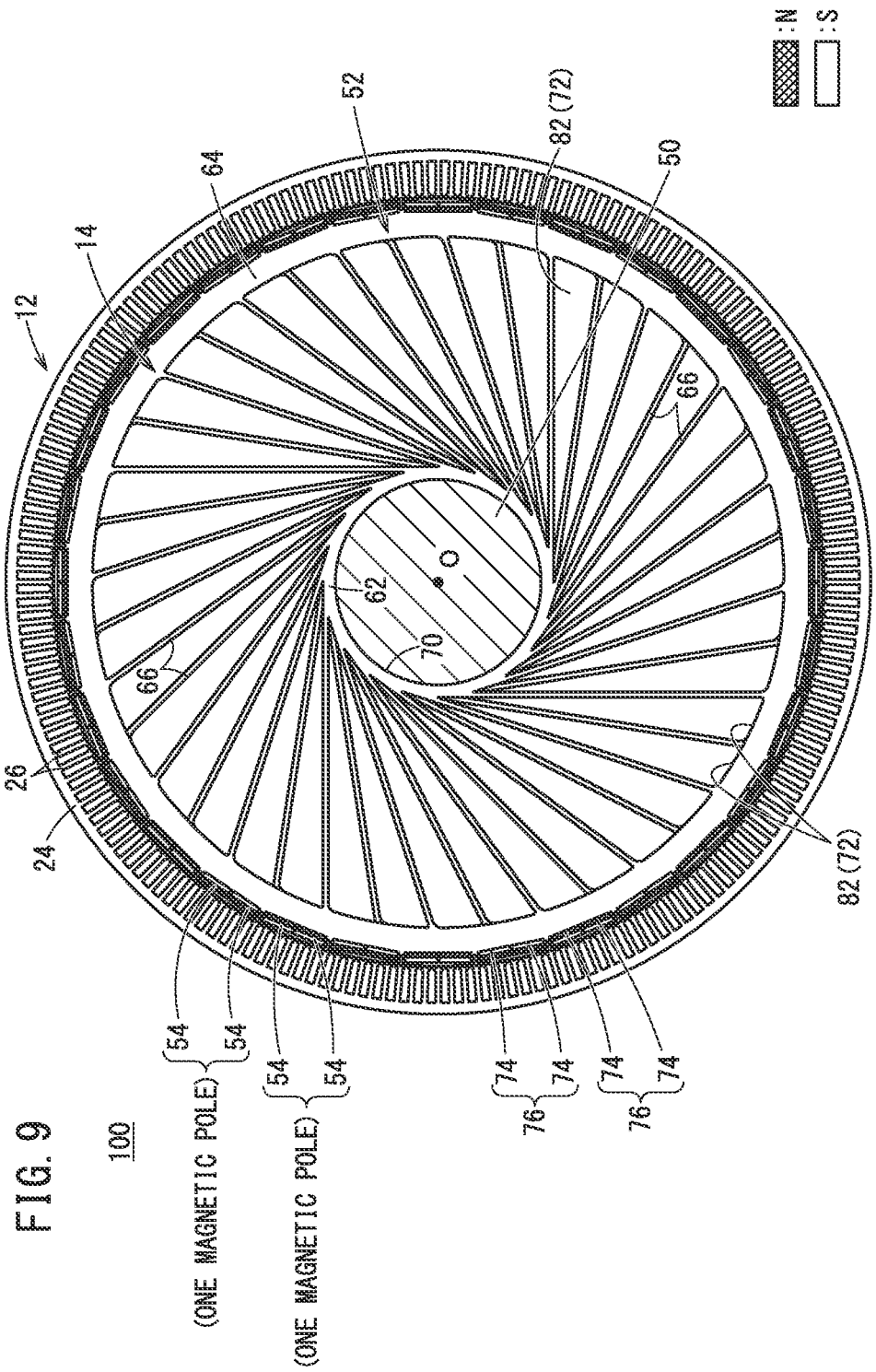
FIG. 9 is a schematic horizontal cross-sectional view of principal components of a rotary electric machine according to another embodiment of the present invention.

In the above-described embodiment, the rotary electric machine 10 including 16 poles and 96 slots is exemplified. However, the number of poles or slots 28 is not particularly limited thereto. For example, as shown in FIG. 8, a 24-pole 144-slot rotary electric machine 90 may be used. Alternatively, as shown in FIG. 9, a 32-pole and 192-slot rotary electric machine 100 may be used. In either case, the number of slots 28 for one magnetic pole is six. In FIGS. 8 and 9, the electromagnetic coils 30 are omitted.

As the number of poles and the number of slots 28 increase, the distance X from the rotation center of the rotor 14 (the center O of the rotating shaft 50) to the outer circumferential edge of the stator core 20 tends to increase. Since the outer diameter of the rotary electric machine 10 is twice the distance X, the outer diameter becomes large in this case. However, the outer diameters of the rotary electric machines 90 and 100 can be set to 450 mm at a maximum by setting the dimensions of the respective portions, the intersection angle, and the like to numerical ranges similar to those of the rotary electric machine 10 illustrated in FIG. 1. Accordingly, the rotary electric machines 90 and 100 can also be made small in scale and lightweight.

In addition, it is possible to cause an enhancement in the rotational torque of the rotating shaft 50 by setting the dimensions of the respective portions, the intersection angle, and the like to the same numerical ranges as those of the rotary electric machine 10 illustrated in FIG. 1. Therefore, according to the rotary electric machines 90 and 100, it is possible to continuously output high torque. That is, also in the rotary electric machines 90 and 100, the same operational effects as the operational effects of the rotary electric machine 10 can be obtained.

Instead of winding the wire material around the teeth portions 26, a metal conductor shown in FIG. 1 of JP 2020-039207 A may be used. The metal conductor has two leg members. Electromagnetic coils are formed by inserting the leg member of a predetermined number of metal conductors into the slots 28.

The rotary electric machines 10, 90, and 100 may function as electrical power generators. In this case, an alternating current is applied to the electromagnetic coils 30 from an external power supply.

What is claimed is:

1. A rotary electric machine comprising:
   a stator including a yoke portion having an annular shape and a plurality of teeth portions configured to protrude from an inner circumferential edge of the yoke portion in a radially inward direction of the yoke portion, slots each being formed between adjacent ones of the plurality of teeth portions; and
   a rotor disposed inside the stator and facing toward the plurality of teeth portions,
   wherein the rotor includes a rotor core configured to retain permanent magnets with a number of poles of 16 to 32, and a rotating shaft configured to rotate integrally with the rotor core,
   the rotor core is a stacked body of a plurality of electromagnetic steel sheets,
   each of the plurality of electromagnetic steel sheets is formed with a first insertion hole in which the rotating shaft is disposed, a plurality of through holes, of one or more hole groups, formed radially outward of the first insertion hole, and a plurality of second insertion holes, of one or more additional hole groups, formed radially outward of the plurality of through holes, the permanent magnets being inserted into the second insertion holes,
   the one or more hole groups and the one or more additional hole groups are comprised by a plurality of hole groups,
   each of the plurality of electromagnetic steel sheets includes an inner annular portion located between the first insertion hole and the plurality of through holes, an outer annular portion located radially outward of the plurality of through holes and including the plurality of second insertion holes formed therein, and a plurality of coupling portions configured to couple the inner annular portion with the outer annular portion,
   when a rotor inner diameter is defined as twice a distance from a center of the first insertion hole to an inner circumferential edge of the inner annular portion, and a rotor outer diameter is defined as twice a distance from the center of the first insertion hole to an outer circumferential edge of the outer annular portion, a ratio of the rotor inner diameter to the rotor outer diameter is within a range of 1:1.5 to 1:3.5,
   the number of the slots is within a range of 96 to 192,
   the plurality of coupling portions extend in a direction inclined with respect to a diameter direction of the plurality of electromagnetic steel sheets, and the number of the plurality of coupling portions in one of the plurality of electromagnetic steel sheets is within a range of 10 to 30.

2. The rotary electric machine according to claim 1, wherein the plurality of electromagnetic steel sheets are stacked in a first mode or a second mode,
   the first mode is a mode in which, in one electromagnetic steel sheet and another electromagnetic steel sheet that are stacked and adjacent to each other among the plurality of electromagnetic steel sheets, the plurality of coupling portions of the one electromagnetic steel sheet and the plurality of coupling portions of the other electromagnetic steel sheet are located so as not to overlap with each other when the rotor is viewed in an axial direction of the rotor, and
   the second mode is a mode in which a plurality of sheet groups each including the plurality of electromagnetic steel sheets are stacked in the axial direction, and in one sheet group and another sheet group that are stacked and adjacent to each other among the plurality of sheet groups, the plurality of coupling portions of the one sheet group and the plurality of coupling portions of the other sheet group are located so as not to overlap with each other when the rotor is viewed in the axial direction.

3. The rotary electric machine according to claim 1, wherein when the stator and the rotor are viewed in an axial direction of the stator, an average number of the slots for one magnetic pole is six.

4. The rotary electric machine according to claim 1, wherein an outer diameter of the stator is within a range of 230 mm to 450 mm.

5. The rotary electric machine according to claim 1, wherein when the plurality of electromagnetic steel sheets are viewed from a stacking direction, each of the plurality of second insertion holes has a rectangular shape,
   two of the permanent magnets are retained by one of the plurality of hole groups such that same magnetic poles face toward the plurality of teeth portions.

6. The rotary electric machine according to claim 1, wherein when the plurality of electromagnetic steel sheets are viewed from a stacking direction, a gap between two of the plurality of second insertion holes, from which one hole group is made up, and a gap between another two of the plurality of second insertion holes, from which another one hole group is made up, are separated from each other by an angle of 360° divided by a number of the plurality of hole groups.

7. The rotary electric machine according to claim 1, wherein two of the plurality of second insertion holes adjacent to each other in at least one or more of the plurality of hole groups are arranged along a circumferential direction of the outer annular portion.

* * * * *